Figure 1:
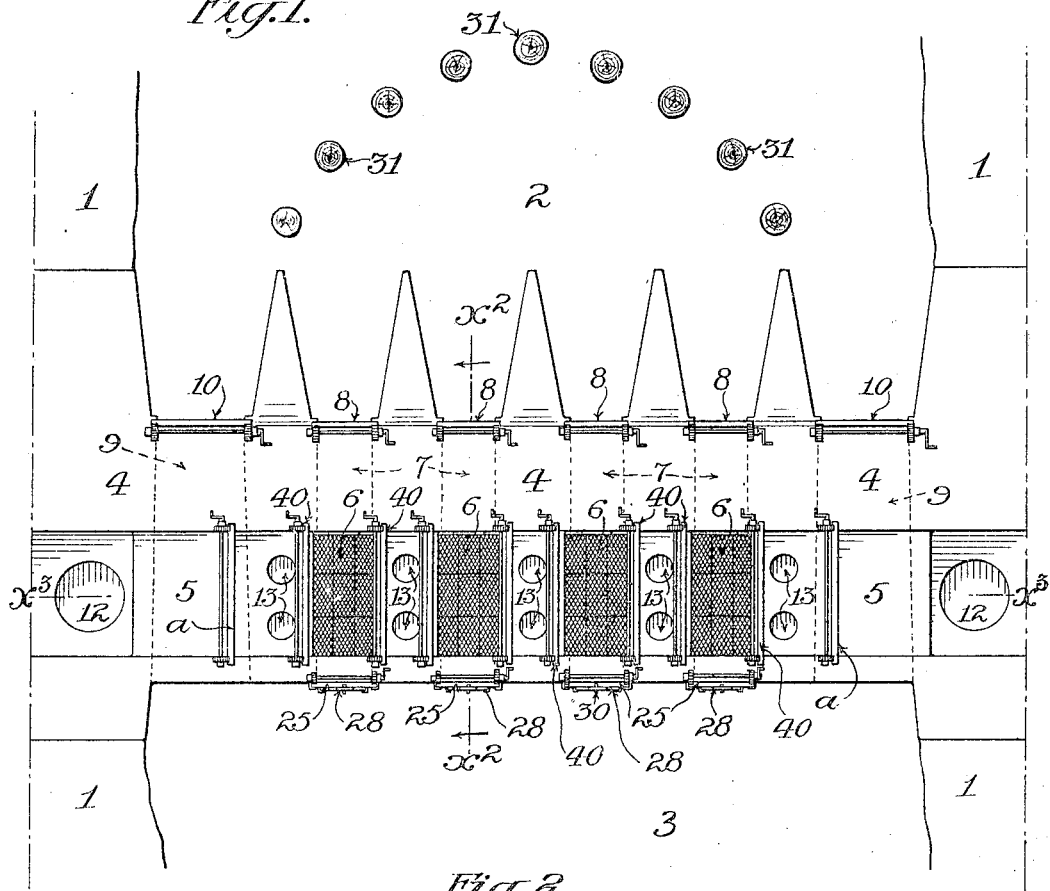

No. 802,183. PATENTED OCT. 17, 1905.
G. W. DURBROW.
FILTERING DAM.
APPLICATION FILED MAR. 20, 1905.

2 SHEETS—SHEET 1.

Witnesses:
Frank L. Graham
F. W. Mansfield

Inventor,
George W. Durbrow
by Townsend Bros.
attys

No. 802,183. PATENTED OCT. 17, 1905.
G. W. DURBROW.
FILTERING DAM.
APPLICATION FILED MAR. 20, 1905.

2 SHEETS—SHEET 2.

Witnesses:
Frank L. Graham
F. Mansfield

Inventor:
George W. Durbrow
by Townsend Bros
attys

UNITED STATES PATENT OFFICE.

GEORGE W. DURBROW, OF INDIO, CALIFORNIA, ASSIGNOR TO DURBROW FILTRATION COMPANY, OF YUMA, ARIZONA TERRITORY, A CORPORATION OF ARIZONA TERRITORY.

FILTERING-DAM.

No. 802,183.        Specification of Letters Patent.        Patented Oct. 17, 1905.

Application filed March 20, 1905. Serial No. 251,052.

*To all whom it may concern:*

Be it known that I, GEORGE W. DURBROW, a citizen of the United States, residing at Indio, in the county of Riverside and State of California, have invented a new and useful Filtering-Dam, of which the following is a specification.

This invention relates to a dam designed particularly for rivers or canals the waters of which are used for irrigating purposes and which frequently carry a great deal of silt or fine sand; and the object of the invention is to provide a dam by which the water may be controlled and which will remove or separate the silt or other sediment carried by the water and deliver the filtered water to the ditches or branch canals, delivering the silt or sediment thus removed to the main stream or canal at a point below the dam, so that it is carried off by that part of the water which is not diverted for irrigating purposes.

Another object is to provide for flushing out the filtering element of the dam to clean the same of silt or other sediment which may accumulate therein during protracted use, as the filtering element is self-cleaning and silt will not readily accumulate therein.

In the present embodiment the filtering element comprises several units, and another object is to segregate or shut off any of the units from the water to allow the unit or units thus segregated to be removed for repair or for any other purpose without interrupting the operation of the dam in filtering with the remainder of the units not thus segregated.

Another object of this invention is to avoid accumulations of sediment and silt on or in the filtering medium and to provide for the filtration of great quantities of water, with ready and convenient disposal of any sediment and silt which may result from the purification of the water.

This invention comprises a dam and a filter disposed in the dam to there perform its filtering operation, and preferably the admission of water to the filter medium is from below through a conduit which communicates with both the upstream and downstream sides of the dam and which may be shut off therefrom by means of gates or other appliances.

Other objects and advantages of the invention will appear in the following description.

The accompanying drawings illustrate the invention.

Figure 2:
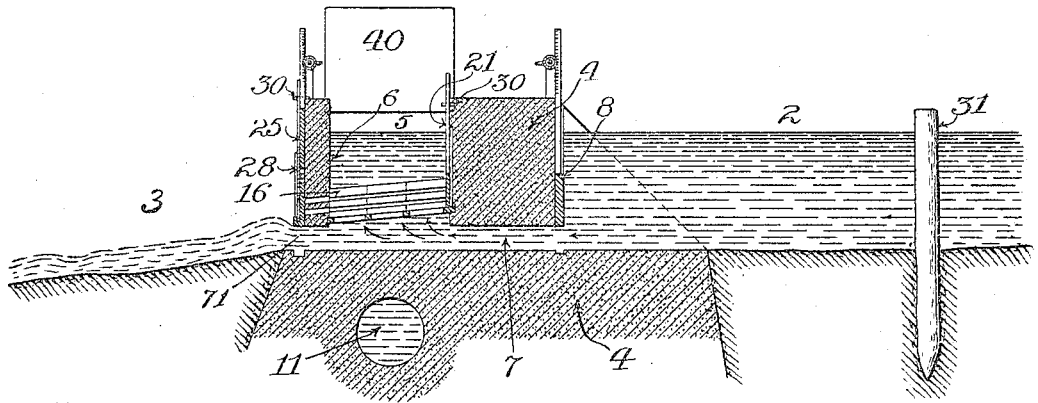
Figure 3:
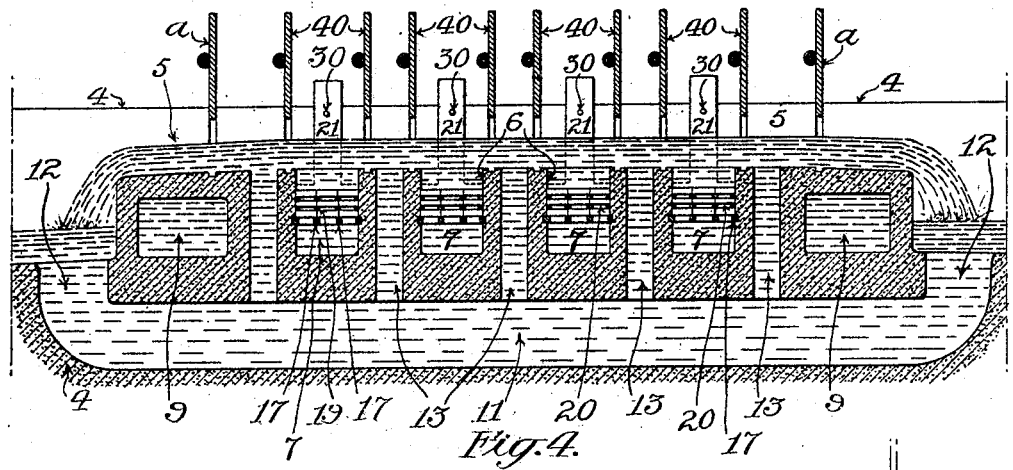
Figure 4:
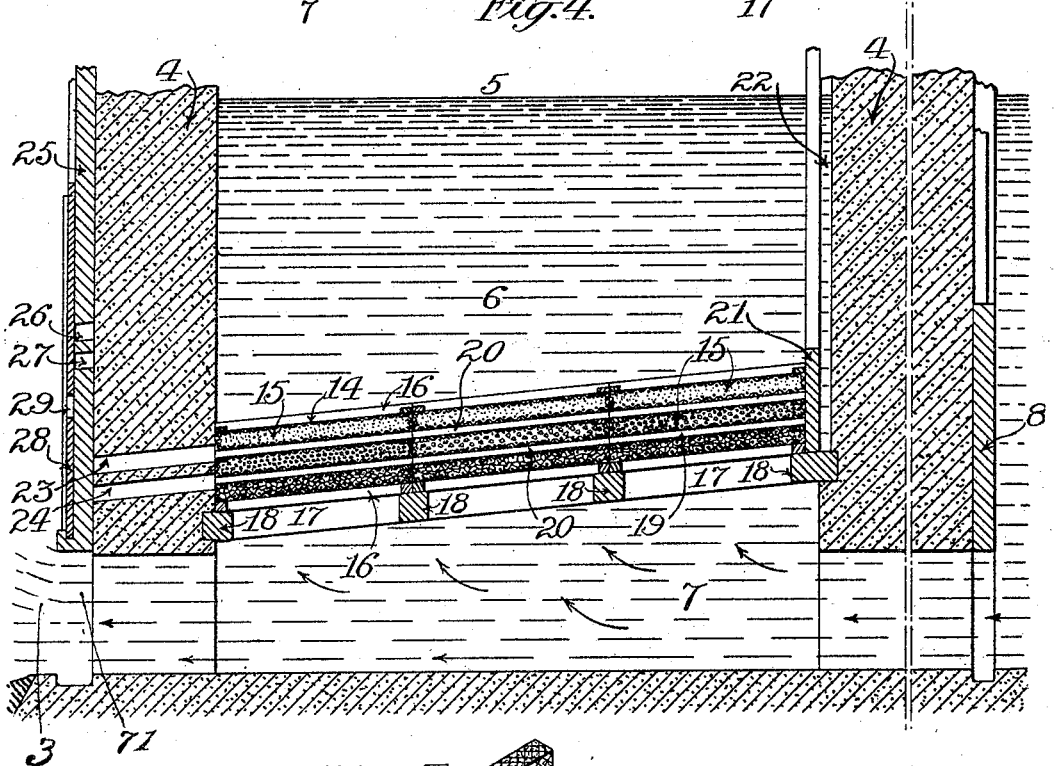
Figure 5:
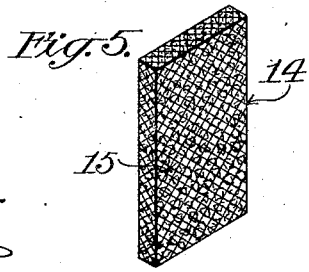

Referring to the drawings, Figure 1 is a plan view of the dam. Fig. 2 is a vertical section on line $x^2 \, x^2$, Fig. 1. Fig. 3 is a vertical section on line $x^3 \, x^3$, Fig. 1. Fig. 4 is a vertical section on a larger scale, taken longitudinally through a filtering unit. Fig. 5 is a perspective view of a retaining-cage which forms one section of a unit.

1 designates the banks of the river or canal. 2 designates the upstream side of the river or canal. 3 designates the downstream side. Extending from bank to bank is a wall of concrete or other masonry 4, in the upper part of which is formed a conduit 5, which extends from bank to bank and communicates at either end with discharge-canals (not shown) for conveying the filtered water away from the dam. In order to control the passage of water from the conduit 5 to these canals, a gate $a$ is provided at each end of the conduit, as shown in Fig. 3.

Formed in the masonry 4 and extending below the conduit 5 is in this embodiment a series of four wells or filtering-cells 6, in which the filtering units about to be described are located.

Formed in the masonry 4 and extending from the upstream side of the dam to the lower part of the filtering-cells 6 are feeding-conduits 7, each of which is provided with an upper gate 8, by means of which the flow of water therethrough may be regulated or entirely shut off, as desired. Near each end of the masonry 4 is a flood-water conduit 9, the upstream side of which has a gate 10. These gates are ordinarily closed, except in case of flood, although they may be adjusted to regulate the head of water back of the dam.

Formed in the masonry 4, below the filtering-cells and flood-conduits 9, is a subconduit 11, connecting with vertical shafts 12, the upper mouths of which open into the ditch or canal, as shown in Figs. 1, 2, and 3. Communicating with the subconduit 11 at intermediate points are vertical shafts 13, the upper mouths of which open into the bottom of the conduit 5.

Arranged within each filtering-cell is a filtering unit. In the present case each filtering unit comprises twenty-seven sections arranged in three layers. Each section comprises a wire cage 14, filled with gravel or other filtering material 15, each cage being supported by a frame 16. The frames 16 of the lowest of the series of layers rest upon inclined beams 17, the ends of which are supported by the masonry 4, as shown in Fig. 4, the frames being further supported by cross-beams 18. The frames 16 of each series are separated from those of the next above by strips 19, so that free spaces 20 are formed between each layer of cages. A gate 21 normally closes the upper end of each filter unit, there being a space 22 back of the gate next to the masonry, as shown in Fig. 4.

The masonry at the downstream side of each filtering-cell has flushing-conduits 23 and 24, the conduit 23 communicating with the upper space 20 and the conduit 24 communicating with the lower space 20. The conduits 23 and 24 are normally closed by a lower gate 25, which has openings 26 and 27. The openings 26 and 27 are normally closed by an auxiliary gate 28, having an opening 29.

In the drawings the gates $a$, 8, 10, and 25 are shown as operated by an ordinary rack-and-pinion gearing, while the gates 21 and 28 are supported by ordinary pins 30, although any form of gearing may be employed for operating any of the gates.

In order to protect the dam from floating logs or other drift, a series of piles 31 are driven into the bed of the stream above the dam, as shown in Figs. 1 and 2.

In operation the gates 8 are opened, although the flushing-conduits 23 and 24 are closed by the gate 25. The gates 40 are open. Water from the upstream side containing the silt or other sediment flows in through the feeding-conduits 7 and works up through the filtering units by which the silt is removed and into the conduit 5, flowing also down the shafts 13 into the subconduit 11 and flowing into the ditches through the shafts 12. The water may be caused to flow out of either or both ends of the conduit 5 by adjusting the gates $a$ accordingly. When it is desired to flush out the filtering units and remove the silt which has accumulated, the gate 25 is lowered to bring the openings 26 and 27 into register with the flushing-conduits 23 and 24. The auxiliary gate 28 is also shifted to bring the opening 29 preferably first into register with the opening 26. Upon the gates 21 being raised the filtered water from the conduit 5 flows down through the recesses and through the upper space 20 and out through the flushing-conduit 23 and openings 26 and 29, in its passage through the space 20 removing the accumulated silt therefrom. Water which is passing up through the cages from the bottom also passes out through the same way, and thus the silt which has lodged in the gravel is floated out also. After the upper space 20 has been cleared in this manner the gate 28 is shifted to bring the opening 29 into register with the opening 27, so that the lower space 20 is opened and flushed in the same manner as the upper one. The filtering units may be flushed in this manner independently of each other. If it is desired to remove any of the sections of filtering units, the unit may be segregated by lowering the adjacent gates 40 and closing its supply-gate 8, so that no more water can enter the unit. The remaining water in the unit thus segregated may be drawn off by arranging the gates 25 and 28 in the manner described for flushing. Thus while one or more filtering units are segregated for either flushing or repair the remainder of units continue in operation, the water filtered thereby being conveyed under the segregated unit by the subconduit 11. When the lower dam-gate 25 is closed partly or wholly across the lower outlet 71, the head of the water in the stream 2 and in conduit 5 will be raised according to the extent to which the outlet 71 is closed, thus giving greater velocity to water which may pass through 23, 24, or 71 when the gates are adjusted for carrying off the silt.

What I claim is—

1. A dam with a conduit therein opening therefrom below the top thereof, and a filter disposed in the dam discharging into the conduit.

2. A dam with a conduit therein opening therefrom below the top thereof, and filters disposed in the dam discharging into the conduit.

3. A dam with upper and lower conduits discharging below the top of the dam, and filters disposed in the dam discharging into the conduit.

4. A dam, a filter disposed therein, and gates for controlling the water delivered to the filter.

5. A dam, filters disposed therein, and independent upper and lower gates for controlling the admission of water to the respective filters.

6. A dam, with a conduit and filter-cells below the conduit, and filters in the cells discharging into the conduit.

7. A dam, with a conduit and filter-cells below the conduit, and filters in the cells discharging into the conduit, the dam having a subconduit under the filter-cells and communicating with the first conduit.

8. A dam, with a conduit and filter-cells below the conduit, and filters in the cells discharging into the conduit, the dam having a subconduit with intermediate shafts between the filter-cells extending from the subconduit to the first conduit.

9. A dam, with a conduit and filter-cells below the conduit, filters in the cells discharging into the conduit, the dam having a subconduit with intermediate shafts between the filter-cells extending from the subconduit to the first conduit, and gates for segregating the filters from the first conduit.

10. A dam with upper and lower conduits, with filtering-cells between the conduits, filters in the cells discharging into the upper conduit, and feeding-conduits extending from the upstream side of the dam to the filtering-cells.

11. A dam with a conduit, a filter in the dam discharging into the conduit, and a gate for controlling the passage of water from the conduit through the filter.

12. A dam with a conduit, a filter in the dam discharging into the conduit, the dam having a flushing-conduit communicating with the filter, and means for controlling the passage of water through the flushing-conduit.

13. A dam with a conduit, a filter in the dam discharging into the conduit, the dam having flushing-conduits communicating with the filter, and means for closing one flushing-conduit when the other is open.

14. A dam with a conduit, a filter in the dam discharging into the conduit, a gate with two openings adapted to register with the flushing-conduits, and an auxiliary gate carried by the first gate with a single opening adapted to register with either of the openings of the first gate.

15. A dam with upper and lower conduits, filters in the dam between the conduits discharging directly into the upper conduit and indirectly into the lower conduit, the dam having a flood-conduit near each end and between the upper and lower conduits, and gates for the flood-conduits.

16. A dam having an upper and lower conduit leading into and out of the dam respectively, and a filter located between the conduits and communicating with each.

17. A dam having an upper and lower conduit leading into and out of the dam respectively, a filter located between the conduits and communicating with each, and a gate for closing the outlet from the lower conduit.

18. A dam having an upper and lower conduit leading into and out of the dam respectively, a gate closing an outlet from the lower conduit, a filter located between the conduits and communicating with each, free spaces being provided in the filter for receiving silt, and a gate for closing an outlet from said spaces.

19. A dam having an upper and lower conduit leading into and out of the dam respectively, a filter located between the conduits and communicating with each, an open space being provided in the filter to receive silt, a gate for closing an outlet from the lower conduit, and provided with an opening for said open space, and a gate carried by said first-mentioned gate for closing the opening in said gate.

In testimony whereof I have hereunto set my hand, at Los Angeles, California, this 3d day of March, 1905.

GEORGE W. DURBROW.

In presence of—
GEORGE T. HACKLEY,
ARTHUR P. KNIGHT.